Sept. 27, 1966  D. A. MATTHEWS  3,275,092
ELECTRIC TRUCK BATTERY COMPARTMENT

Filed May 5, 1964  2 Sheets-Sheet 1

Inventor
Dean A. Matthews
By Charles T. Scherel
Attorney

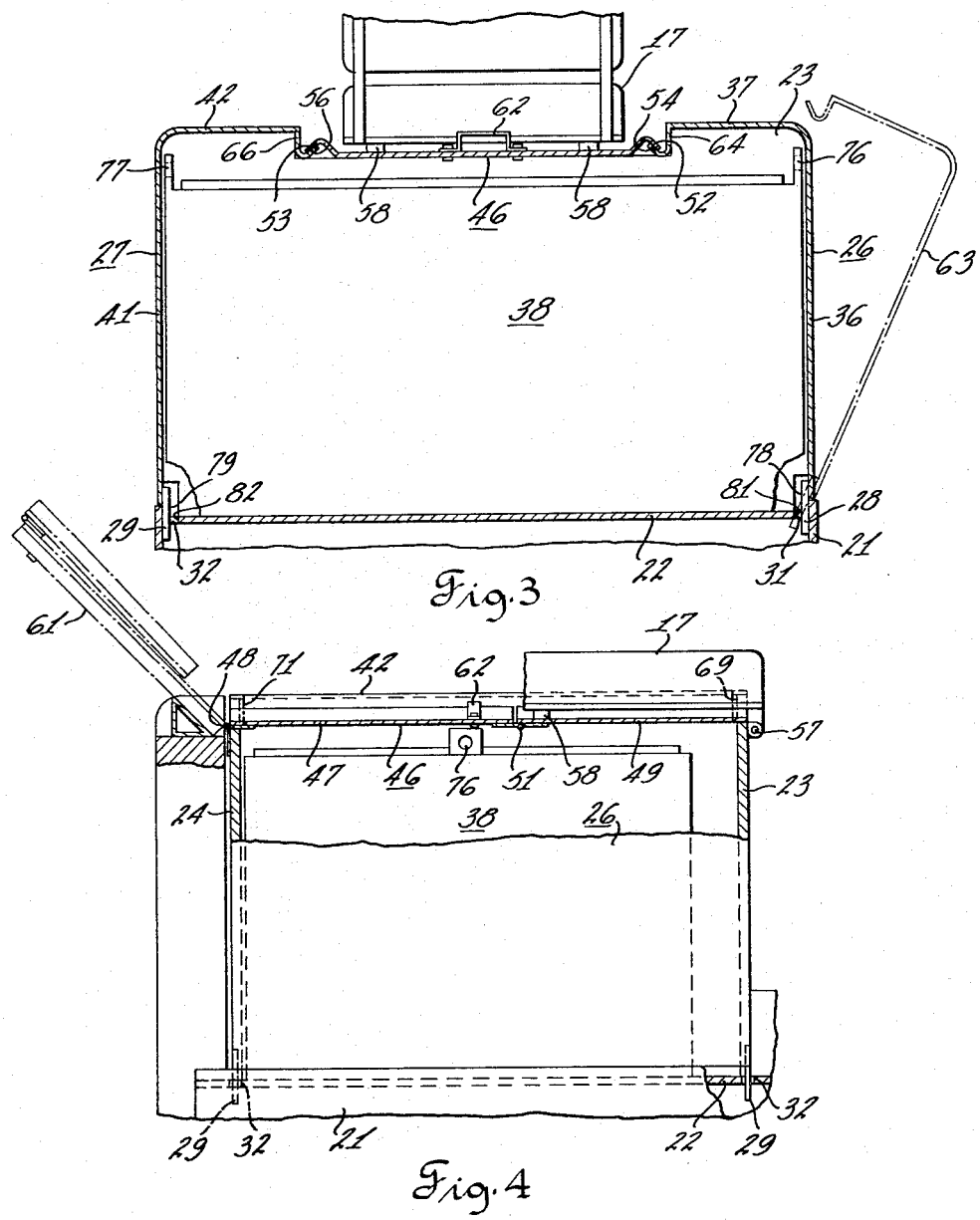

United States Patent Office 3,275,092
Patented Sept. 27, 1966

3,275,092
ELECTRIC TRUCK BATTERY COMPARTMENT
Dean A. Matthews, Chicago Heights, Ill., assignor to Allis-Chalmers Manufacturing Company, Milwaukee, Wis.
Filed May 5, 1964, Ser. No. 364,911
19 Claims. (Cl. 180—68.5)

This invention relates to a battery compartment for an electric lift truck.

It is an object of this invention to provide a battery compartment for a lift truck wherein the weight of the operator upon the driver's seat maintains the top panel of the compartment in interlocking engagement with other segments of the compartment.

It is a further object of this invention to provide a battery compartment which may be quickly opened up to permit servicing of the battery.

It is a further object of this invention to provide an electric lift truck having a battery compartment with removable side panels which are held in place by a top panel and wherein a seat rests on the top panel to hold it in its closed position.

It is a further object of this invention to provide a battery compartment having side panels with horizontally extending segments extending inwardly in overlying relation to the battery and a top panel in interlocking engagement with the horizontally extending portions of the side panels.

It is a further object of this invention to provide a battery compartment having a top panel which in its closed position locks the side panels in place and which has a rearwardly retracted position.

It is a further object of this invention to provide an electric truck having a battery compartment including a retractable top panel interlockingly engaging side panels which swing outwardly to permit upward withdrawal of the battery from the compartment when the top panel is retracted and the operator's seat is swung forwardly.

It is a further object of this invention to provide a battery compartment for an electric truck which can be quickly opened by one man without tools.

It is a further object to provide a battery compartment which can be quickly opened by one man without tools to permit the battery herein to be removed upward or laterally from either side of the truck.

Figure 1:
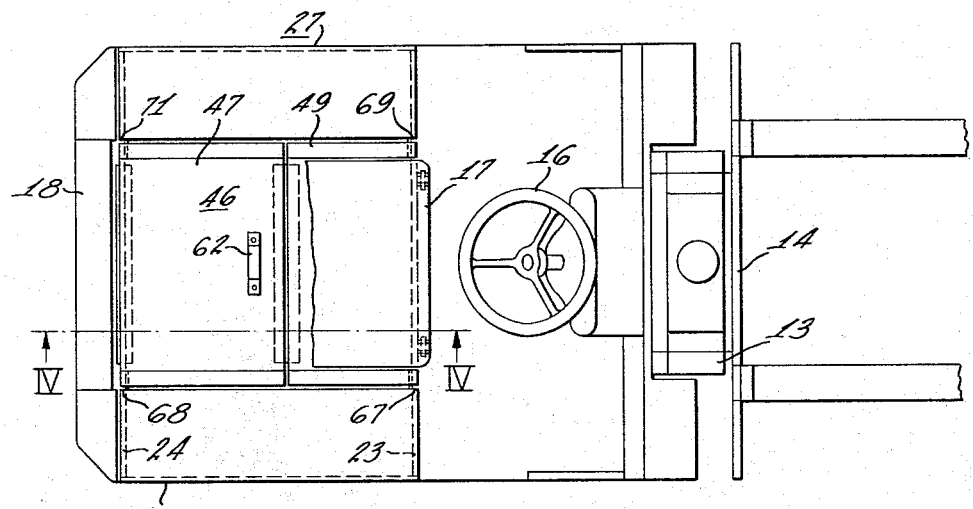
Figure 2:
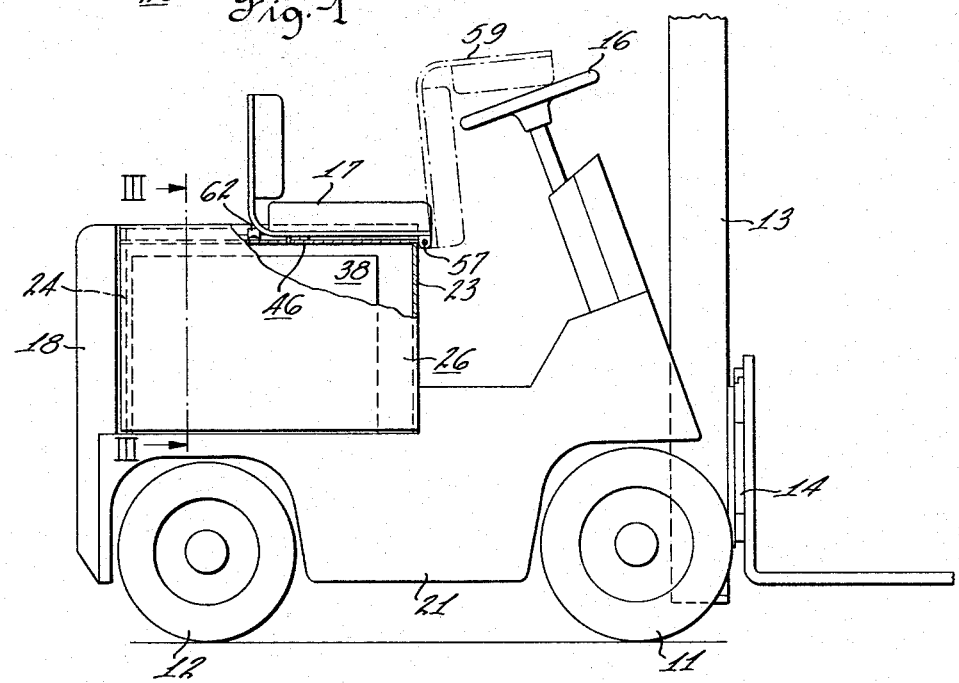

These and other objects and advantages of this invention will be apparent to those familiar with the art when the following description is read in conjunction with the drawings in which:

FIG. 1 is a top view of an electric lift truck incorporating this invention;
FIG. 2 is a side view of the truck shown in FIG. 1;
FIG. 3 is an enlarged section view taken along the line III—III in FIG. 2; and
FIG. 4 is an enlarged section view taken along the line IV—IV in FIG. 1.

Referring to FIGS. 1 and 2 the electric lift truck includes a pair of driving wheels 11, a pair of steering wheels 12, a mast 13 with carriage 14, steering wheel 16 and operator's seat 17. A counterweight 18 is provided as usual at the rear of the truck.

Referring also to FIGS. 3 and 4, the lift truck frame 21 includes a battery supporting portion 22 which constitutes the bottom wall of an electric battery compartment. The front wall 23 and rear wall 24 are rigidly secured, as by welding or bolting, to the bottom wall 22 and thus to the frame 21. A pair of side panels 26, 27 are releasably connected to the frame 21 by releasable connecting means including fingers or stakes 28, 29, and openings 31, 32. Side panel 26 has a vertical wall segment 36 and a horizontal wall segment 37 extending inwardly in overlying relation to the battery 38 and likewise side panel 27 has a vertical wall segment 41 and a horizontal wall segment 42 connected to and extending inwardly from the top of the vertical wall segment 41.

A double hinged top panel 46 has a rear section 47 pivotally connected to the rear wall 24 on a transverse axis 48 and a front section 49 pivotally interconnected with the rear section 47 on a transverse axis 51. The inner ends of the horizontal segments 37, 42 terminate in upwardly inclined surfaces 52, 53 which are complementary to downwardly inclined surfaces 54, 56, respectively, formed on the laterally opposite edges of top panel segments 47, 49. The operator's seat 17 is pivotally connected to the front wall 23 of the battery compartment for pivotal swinging movement on a transverse axis 57 from its normal occupant receiving position in which it rests on the front section 49 by engagement of resilient pads 58 therewith to a forwardly disposed position shown in dash-dot lines 59 in FIG. 2 wherein the seat 17 rests against the steering wheel 16. A substantial portion of the weight of the lift truck operator is transferred to the top panel 46 to effect camming engagement of the tapered or inclined surfaces 52, 54 and 53, 56, thereby drawing the side panels inwardly into full engagement with the front and rear walls 23, 24. This camming and interlocking engagement between the top and side panels minimizes or prevents rattling of the releasable components 26, 27, 46 of the battery compartment.

Operation

When the operator or serviceman wishes to inspect the battery 38 the operator's seat 17 is shifted to its forwardly disposed position 59 and the top panel is moved to its retracted position shown in dot-dash lines 61. A handle 62 is provided for manually retracting the top panel. If it is desired to fully expose the top of the battery the side panels may be pivoted laterally outwardly about the releasable connection at their bottoms with the frame 21 to an open position such as shown in dot-dash lines 63. The hooklike inner ends 64, 66 are cut away at the front and rear to provide notches 67, 68, 69, 71, thus permitting laterally outward swinging of the side panels without lifting thereof.

With the seat pivoted forwardly to its position 59, the top panel 46 retracted to its position 61 and the side panel swung outwardly, the battery may be lifted vertically out of the truck since the seat 17, top panel 46 and side panels 63 in such positions do not overlie the battery. Lifting eyes 76, 77 are provided on the battery.

If it is desired to remove the battery laterally from the truck the side panels may be lifted from the truck when they are in their swung out position as illustrated by dot-dash lines 63. The laterally inner surface of the stakes 28, 29 form abutments 78, 79 engageable with abutments 81, 82 on the bottom wall when the side panels are swung outwardly sufficiently to permit the battery to clear them when lifted vertically from the truck.

When it is desired to close the battery compartment the side panels 26, 27 are installed and swung inwardly to their closed position, the top panel 46 is grasped by the handle 62 and swung forwardly. The front section 49 of the top panel will swing forwardly about axis 51 like a pendulum and then the top may be quickly lowered to its closed position. The seat is moved to its occupant receiving position thus completing the closing of the battery compartment.

My battery compartment is designed to permit quick opening and closing by one man without tools. The side panels of my invention, for most lift truck sizes, can be lifted off the truck by a single man.

The embodiments of the invention for which an exclusive property or privilege is claimed are defined as follows:

1. An electric lift truck comprising:
a truck frame including a portion adapted to support a battery,
side panels releasably connected to said frame at opposite lateral sides of said portion,
a top panel releasably interlocked with said side panels and
a driver's seat connected to said frame, said seat being shiftable between an occupant receiving position overlying said top panel in which a substantial portion of the weight of the operator is transferred through the seat to said top panel to maintain the latter in interlocking engagement with said side panels and a shifted position wherein said seat does not overlie said top panel and the latter may be removed from its interlocking engagement with said side panels.

2. The structure set forth in claim 1 wherein said top panel is pivotally connected on a transverse axis to said truck frame for swinging movement between a closed position in which it interlockingly engages said side panels to an open position in which it does not overlie said portion.

3. The structure set forth in claim 2 wherein said top panel comprises two sections pivotally interconnected on a transverse axis.

4. The structure set forth in claim 1 wherein said side and top panels have complementary tapered surfaces in camming engagement with one another whereby said top panel interlockingly engages said side panels upon the truck operator occupying said seat in its occupant receiving position.

5. The structure set forth in claim 4 wherein said top panel is pivotally connected on a transverse axis to said truck frame for swinging movement between a closed position in which said tapered surfaces on said top panel are in camming engagement with said tapered surfaces on said side panels to an open position in which it does not overlie said portion.

6. The structure set forth in claim 5 wherein said top panel comprises two sections pivotally interconnected on a transverse axis.

7. The structure set forth in claim 4 and further comprising connecting means releasably connecting said side panels to said frame for laterally outward swinging movement.

8. The structure set forth in claim 7 wherein said side panels each have a vertical wall segment at the side of said truck and a horizontal wall segment connected to the top of said vertical wall segment and extending inwardly.

9. The structure set forth in claim 8 wherein said side panels are swingable about said connecting means between a closed position and a laterally outward disposed open position in which said horizontal wall segments do not interfere with vertically upward removal of a battery from said portion.

10. The structure set forth in claim 9 wherein said connecting means include abutments on said frame and side panels, respectively, limiting lateral outward swinging movement of said side panels.

11. The structure set forth in claim 8 wherein said horizontal wall segments and said top panel have complementary tapered surfaces in engagement with one another.

12. The structure set forth in claim 11 wherein said top panel comprises two sections pivotally interconnected on a transverse axis and wherein one of said sections is pivotally connected to said frame.

13. The structure set forth in claim 12 wherein said side panels are swingable about said connecting means from a closed position in which said top panel is engageable therewith to a laterally outward open position wherein said side panels do not interfere with removal of a battery from said portion.

14. An electric lift truck comprising:
a truck frame,
a battery compartment having front and rear vertical walls secured to said frame,
a horizontal bottom wall secured to said frame and adapted to receive a battery,
side panels releasably connected to said frame at opposite lateral sides of said bottom wall,
a top panel engageable with the top of said side panels, and
cooperating interlocking means formed on said top and side panels,
a driver's seat pivotally connected to said front wall, said seat being pivotable from an occupant receiving position overlying said top panel in which the weight of the operator is transferred through the seat to said top panel to maintain the latter in interlocking engagement with said side panels to a forwardly disposed position wherein said seat does not overlie said top panel.

15. The structure set forth in claim 14 wherein said interlocking means are complementary tapered surfaces formed on said top and side panels.

16. The structure set forth in claim 15 wherein said side panels each have a vertical wall section and a horizontal wall segment extending inwardly from the top of said vertical wall segment and wherein said tapered surfaces on said side panels are formed on the inner ends, respectively, of said horizontal wall segments.

17. The structure set forth in claim 16 wherein said top panel is movable to a position in which it does not overlie said bottom wall and said side panels are swingable outwardly a sufficient extent to permit vertical removal of a battery from said compartment.

18. The structure set forth in claim 17 wherein said top panel is pivotally hinged to said rear wall and swingable from a horizontally disposed closed position to a rearward open position out of overlying relation with said bottom wall.

19. The structure set forth in claim 18 wherein said side panels may be removed from said truck by swinging them outwardly and then lifting them.

References Cited by the Examiner

UNITED STATES PATENTS

| | | | |
|---|---|---|---|
| 1,067,256 | 7/1913 | Kennedy | 180—65 |
| 2,327,848 | 8/1943 | Schroeder | 187—9 |
| 2,774,498 | 12/1956 | Cordes et al. | 187—9 |
| 3,058,771 | 10/1962 | Hill et al. | 296—37 |

FOREIGN PATENTS 717,876  11/1954  Great Britain.

BENJAMIN HERSH, *Primary Examiner.*

MILTON L. SMITH, *Examiner.*